United States Patent [19]

Tellefson

[11] Patent Number: 5,117,579
[45] Date of Patent: Jun. 2, 1992

[54] METHOD AND APPARATUS FOR APPLYING FIXED NITROGEN TO PLANTS

[76] Inventor: Willis A. Tellefson, 155 E. Hall St., Leland, Ill. 60531

[21] Appl. No.: 656,786

[22] Filed: Feb. 15, 1991

[51] Int. Cl.$^5$ ............................................. A01H 5/00
[52] U.S. Cl. ...................................... 47/1.3; 422/904
[58] Field of Search ............................. 47/1.3; 422/904

[56] References Cited

U.S. PATENT DOCUMENTS

| | | | |
|---|---|---|---|
| 1,304,823 | 5/1919 | Thomas | 422/904 X |
| 1,317,705 | 10/1919 | Island | 422/904 X |
| 1,458,525 | 6/1923 | Daniels et al. | 422/904 X |
| 1,992,566 | 2/1933 | Brines | 422/904 X |
| 4,287,040 | 9/1981 | Alamaro | 422/904 X |
| 4,482,525 | 11/1984 | Chen | 422/904 X |
| 4,559,206 | 12/1985 | Treharne et al. | 422/904 X |
| 4,873,061 | 10/1989 | O'Hare | 422/904 X |
| 4,877,589 | 10/1989 | O'Hare | 422/904 X |
| 4,915,915 | 4/1990 | Treharne | 422/904 X |

OTHER PUBLICATIONS

Buckman, H. O., et al. "Chapter 2 The Supply and Availability of Plant Nutrients in Mineral Soils" *The Nature and Properties of Soils* The Macmillan Company (7th Edition) 1969 pp. 18-40.

*Primary Examiner*—James R. Feyrer
*Attorney, Agent, or Firm*—Charles F. Meroni, Jr.

[57] ABSTRACT

An electrical ion emitting farming implement to be moved over a field of crop planted in earth for above ground atmospheric treatment of growing plants comprising a frame. A series of bell-shaped members are mounted at spaced intervals on a boom across its transversely extended length and with the bell-shaped members opening in a downward direction toward underlying plants in a field of crops. A wire brush-like ion emitter is centrally mounted in each of the bell-shaped members. An electrical circuit ion generating mechanism operatively connected to the wire brush-like ion emitters for emitting electrical ions in the 30 to 50 KV range through the wire brush-like ion emitters. A power source is provided for energizing the electrical circuit means. A control is provided for activating the electrical circuit means for causing ion emission through the wire brush-like ion emitters upon placement of the bell-shaped members in spaced overhead position relative to the plants being treated. The electrical circuit ion generating means includes a pulsed high output ion generator. The generator has at least of pair of selectable frequencies operable in a range of 90 HZ through 400 HZ. is positioned forwardly of the emitters to be dragged in the earth to complete the circuit.

34 Claims, 10 Drawing Sheets

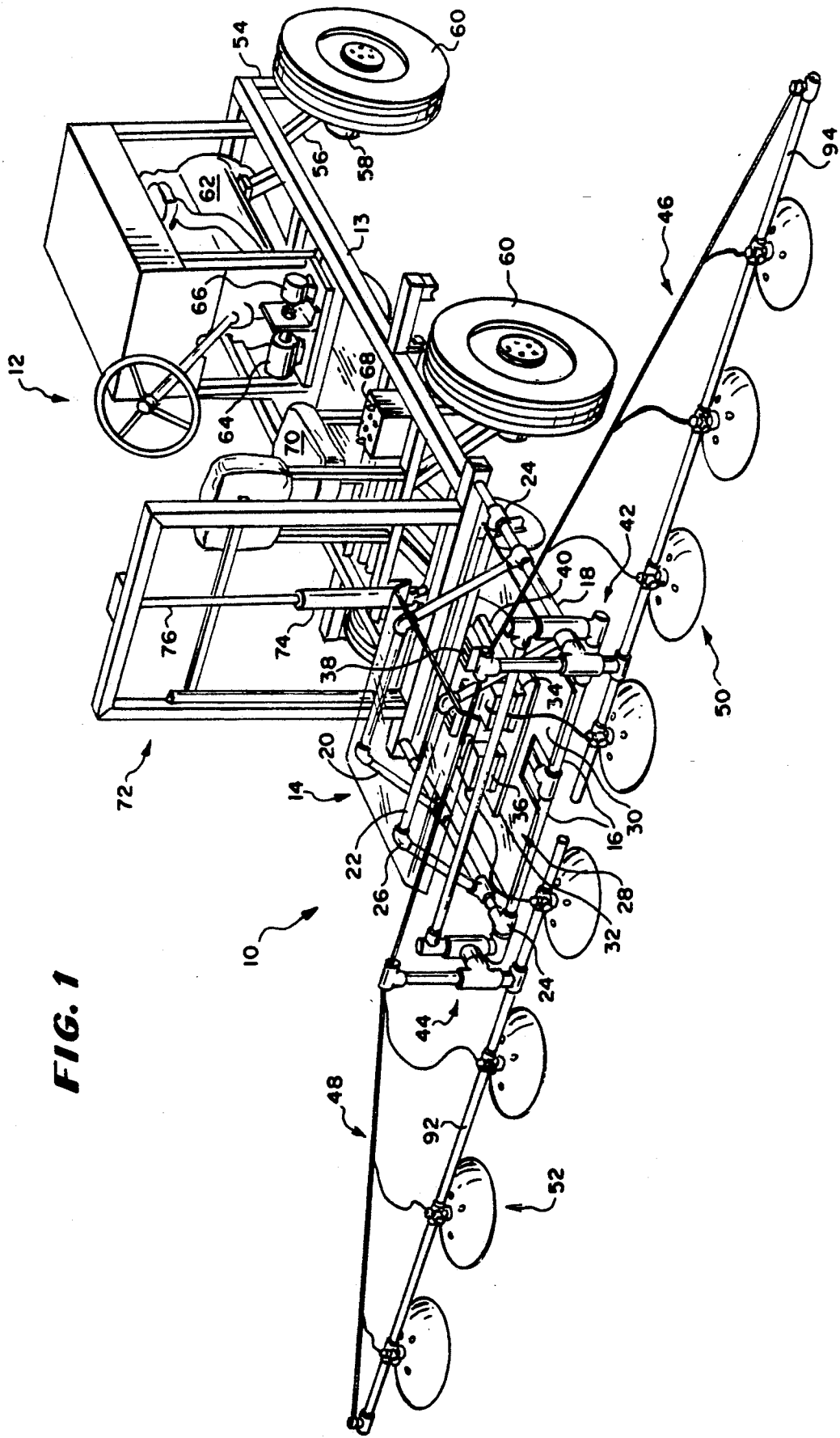

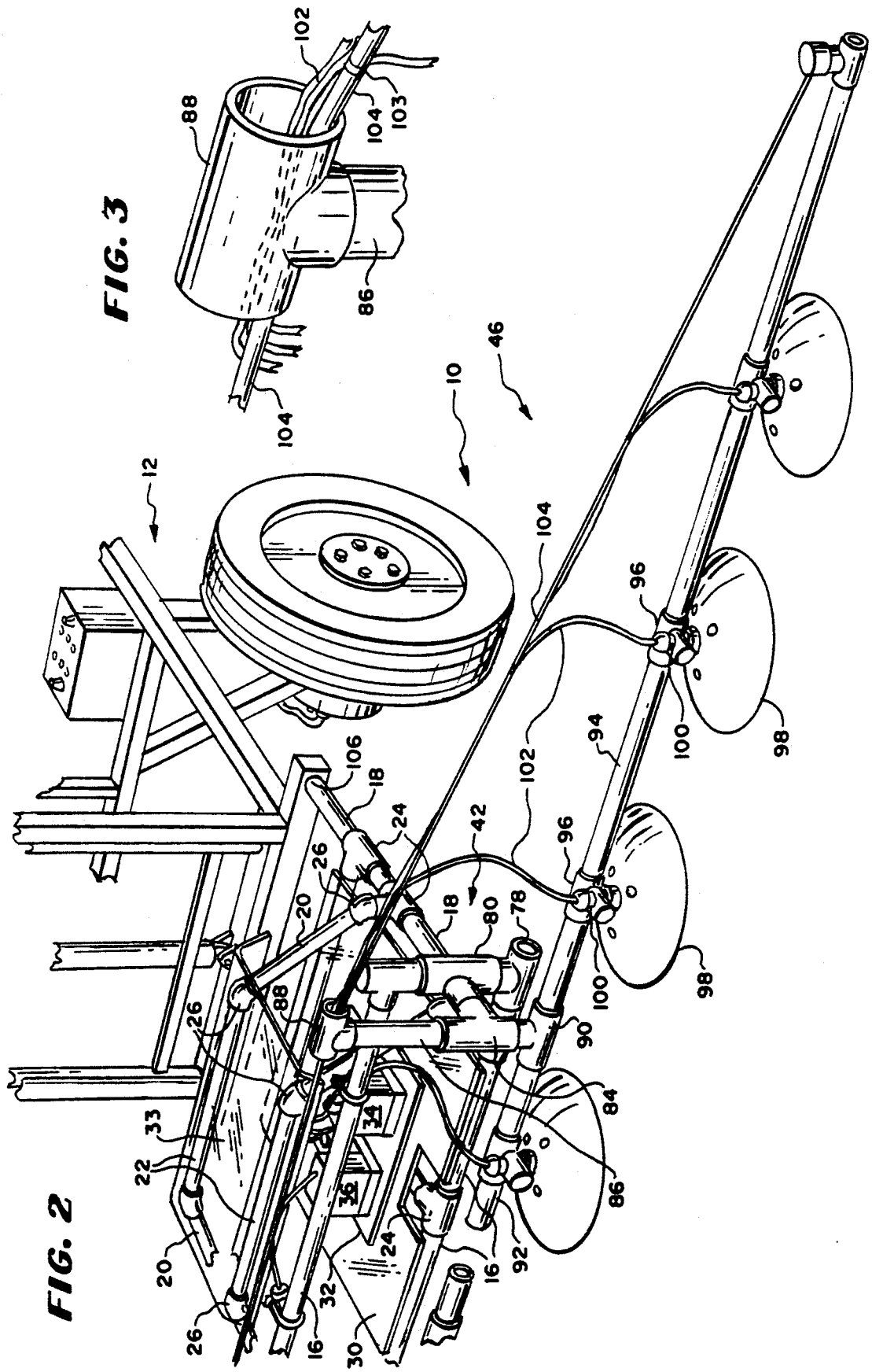

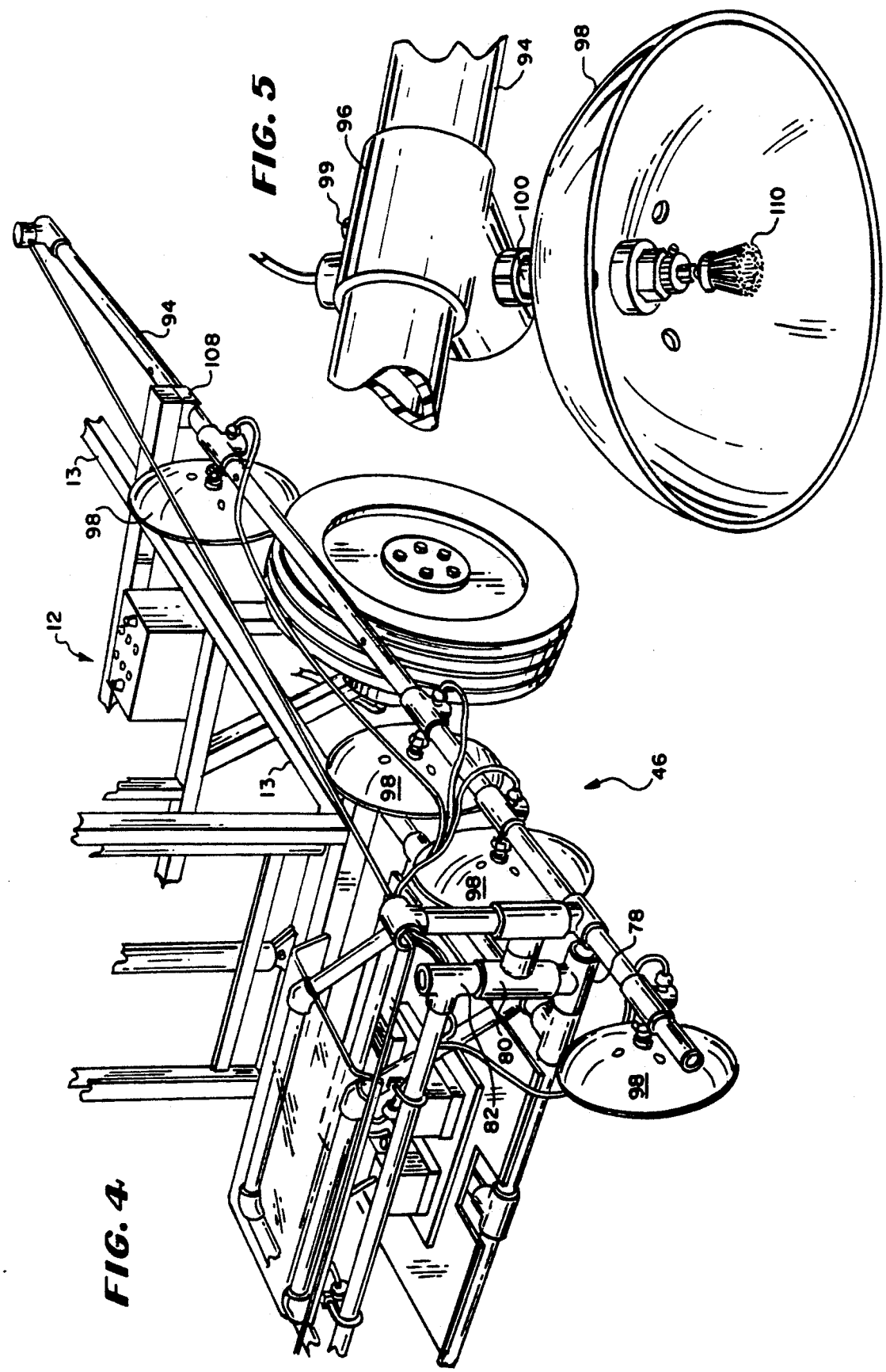

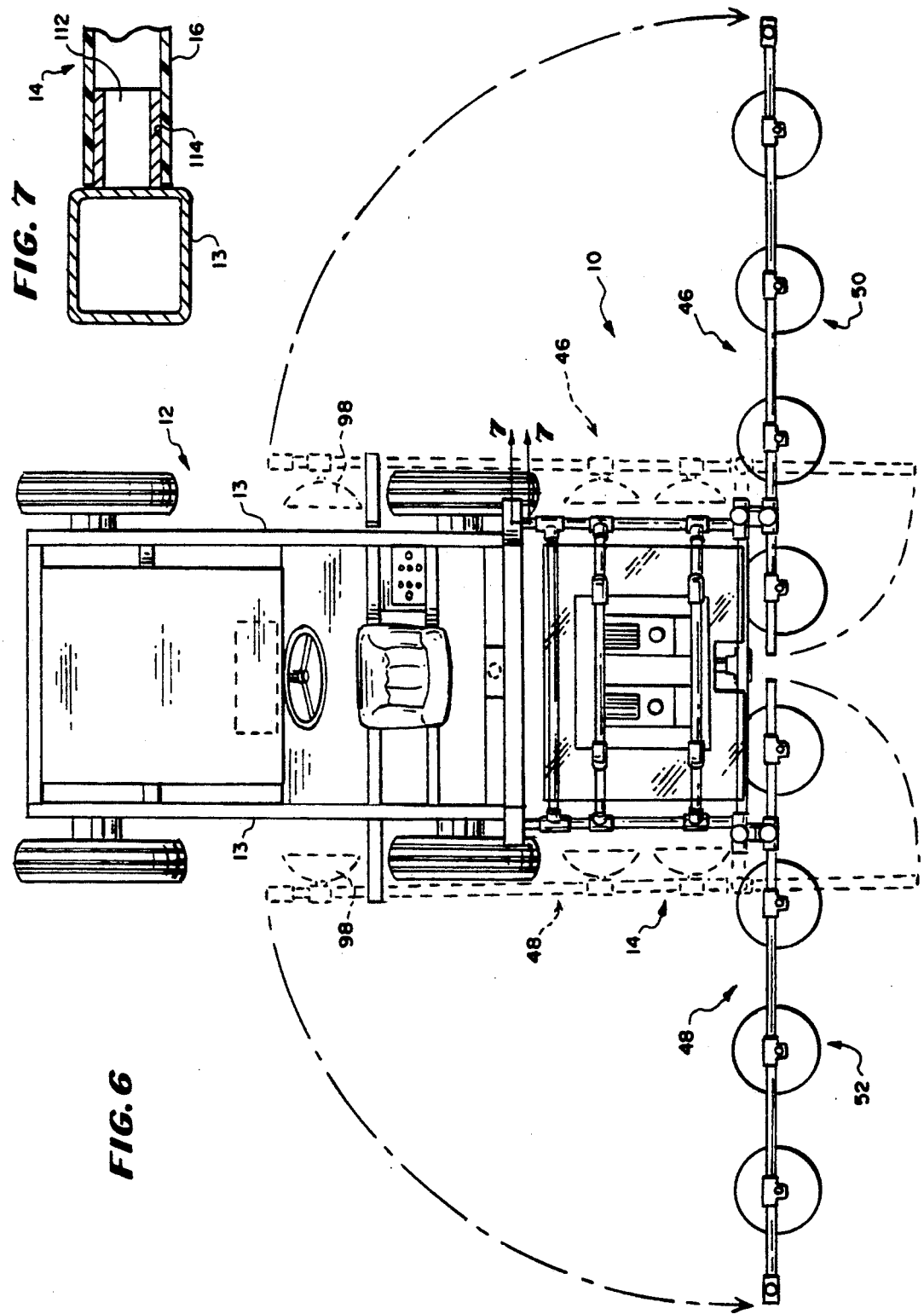

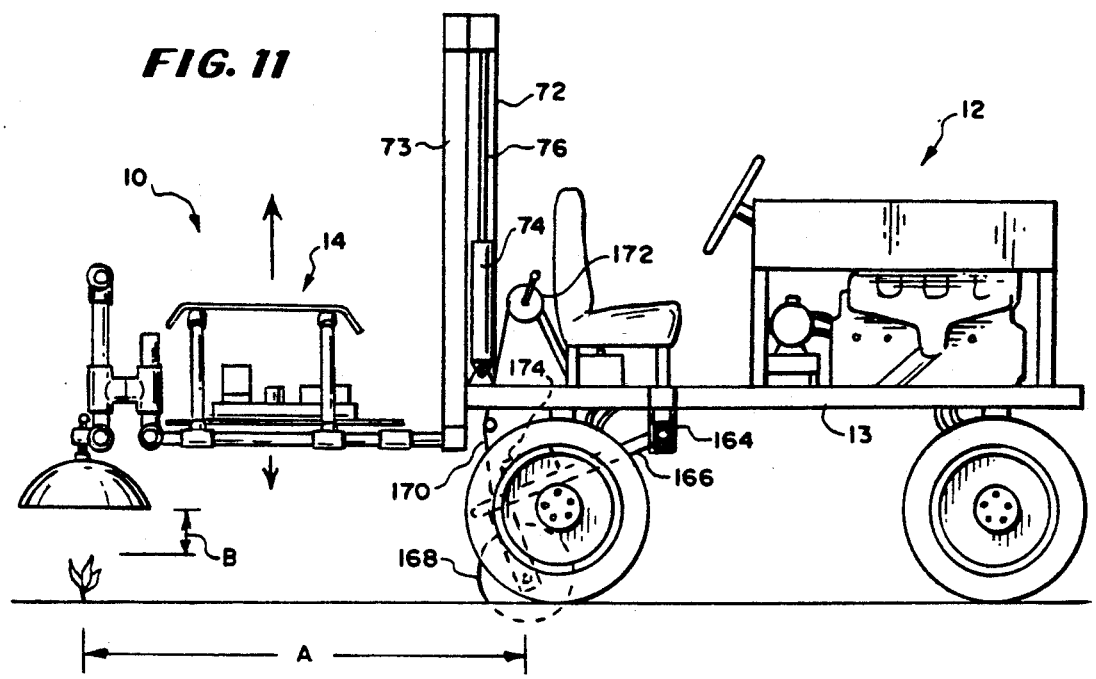
FIG. 11
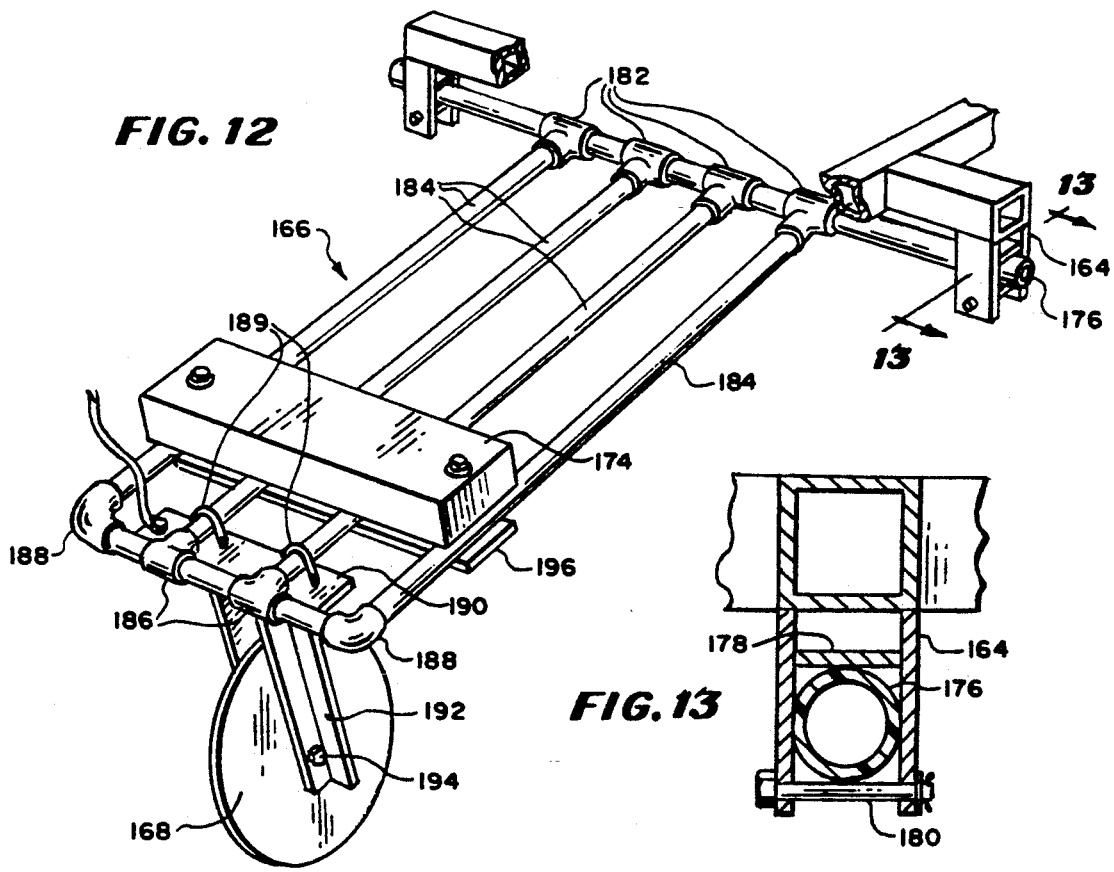
FIG. 12
FIG. 13

METHOD AND APPARATUS FOR APPLYING FIXED NITROGEN TO PLANTS

BACKGROUND OF THE INVENTION

1. Field of the Invention

The present invention relates to an apparatus for fixation of nitrogen in a cultivated field and a method of using same.

2. Description of the Prior Art

It will be appreciated, with the use of various types of nitrogen fertilizer for promoting the growth of plants, that there are adverse effects because of run-offs that occur due to rain and snowfall and floods whereby waterways are becoming and have become overloaded with the residues from the nitrogen fertilizers. Accordingly if the use of nitrogen fertilizers can be eliminated and/or substantially reduced, damage to our environment can be greatly minimized.

It is known that release of electrical ions in proximity to plants, such as occurs during a lightning storm, causes fixation of plant non-available nitrogen into forms which are plant available.

Heretofore various methods, and apparatus used in the methods, of nitrogen fixation have been proposed.

For example, the Thomas U.S. Pat. No. 1,304,823 issued in 1919 teaches an apparatus used in electrical fixation of gases such as nitrogen. Electrodes form an arc therebetween and gases are forced thereacross, converting the gaseous elements into desired products.

James Island proposes in U.S. Pat. No. 1,317,705 a cost effective method and apparatus used in fixation of nitrogen. Here, heat in the form of a double walled tubular flame is incorporated to heat the air and maximize fixation while minimizing expenditure of electrical energy.

The Daniels U.S. Pat. No. 1,458,525 also discloses a method of nitrogen fixation wherein a streaming electrical discharge is produced which is conducive to a rapid formation of nitrogen pentoxide with a low power consumption.

The Briner U.S. Pat. No. 1,992,566 discloses fixation of atmospheric nitrogen by creating an electrical arc using electrodes of materials easily yielding electrons, such as, for example, alkali and alkaline earth metals.

The Alamaro U.S. Pat. No. 4,287,040 discloses a process and system for production of nitric oxides by establishing an electrical charge, passing through the discharge a mixture of air and nitric oxide as a seeding material to improve process economics, and recovering the nitric oxides.

The Chen U.S. Pat. No. 4,482,525 discloses a nitrogen fixation apparatus having a volumetric electric discharge chamber which provides an even distribution of an electron beam and is at a controlled energy to pressure ratio to promote formation of vibrationally excited $N_2$ which reacts quickly with atomic oxygen improving the rate at which NO is formed.

The Treharne et al U.S. Pat. No. 4,559,206 discloses an arc reactor for producing nitrogen oxides by an electrical discharge process, the reactor including an igniter electrode and circuit responsive to discharge electrode voltage causing arcing of the igniter electrode when discharge electrode voltage rises to a set level.

The O'Hare U.S. Pat. No. 4,873,061 discloses the use of solar energy in nitrogen fixation. A solar concentrator is provided which raises the temperature of reactant gases containing nitrogen to a very high temperature. The resulting products are then rapidly cooled in a heat transfer unit, the heat being recirculated to a preheater stage of the solar concentrator.

Finally, the Treharne U.S. Pat. No. 4,915,915 discloses a system for producing nitrogen fertilizer using an electric arc process wherein the arc is generated by piezoelectric elements actuated by a hammer mechanism powered by water from a garden hose, the nitrogen oxides being drawn into the water simultaneously fertilizing the area being watered.

Also, other electrical treatments of plants and their ambient environment are disclosed in the following U.S. Patents:

| INVENTOR'S NAME | TITLE OF PATENT | U.S. PAT. NO. |
|---|---|---|
| Lemstrom | Means for Promoting Vegetation | 525,988 |
| R. Fessenden | Method & Apparatus for Agricultural Engineering | 1,268,949 |
| E. J. Dougherty | Agricultural Apparatus | 1,331,808 |
| H. L. Roe | Method & Apparatus for the Practice of Agriculture | 1,737,866 |
| F. W. Opp | Apparatus For & Method of Electrically Treating Soil | 2,007,383 |
| F. W. Opp et al. | Apparatus for Electrically Treating the Soil | 2,588,561 |
| R. R. Poynor | Electric Weed Killer | 2,682,729 |
| R. Topel | Attachment for an Agricultural Apparatus | 2,876,586 |
| V. Marcoux et al. | Apparatus for Electroculture | 3,559,337 |
| D. L. Brunton et al. | Method of Fixing Nitrogen in the Atmosphere and the Soil | 3,623,265 |
| R. H. Pluenneke | Method & Apparatus for Using Electrical Current to Destroy Grass and Weeds | 3,919,806 |

As will be described in greater detail hereinafter, applicant's method and apparatus differ from those previously proposed by being mobile for use in a cultivated field to treat the ambient environment within which the cultivated plants exist as well as by creating a grounding path through the apparatus thereby drawing charged ions created into the soil by use of a grounding plate.

SUMMARY OF THE INVENTION

An electrical ion emitting farming apparatus to be moved over a field of crops planted in earth for fixation of nitrogen in the ambient environment of the growing plants comprising a frame, means for connecting the frame to a vehicle, a boom mounted on the frame so as to extend transversely of the frame and transversely of a towed path of travel of the frame through a field of crops, a series of bell-shaped members mounted at spaced intervals on the boom across its transversely extended length and with the bell-shaped members opening in a downward direction toward the crop plants, and electron emitter which is believed to cause chemical reactions in the air converting free nitrogen from a form unavailable to plants, to forms available to plants, as for example, nitrates, nitrites, ionic nitrogen compounds, etc. As a matter of convenience, the electron emitter will be referred to as an ion emitter in the description to follow. Each ion emitter comprises a wire brush-like ion emitter centrally mounted in each of the bell-shaped members, electrical circuit ion generating means operatively connected to the wire brush-like ion emitters for emitting electrical ions in the 30 to 50 KV range through the wire brush-like ion emitters into the ambient environment of the plants including at least a pair of selectable frequencies operable in a range of 90 HZ through 400 HZ, power means for energizing the electrical circuit means, control means for activating the electrical circuit means for causing ion emission through the wire brush-like ion emitters upon placement of the bell-shaped members in spaced overhead position relative to the plants, and electrical ground means to be dragged in and through the earth positioned in operative relation to the wire brush-like ion emitters. The electrical circuit ion generating means include a pulsed high output ion generator.

The ion emitters are positioned in an ideal range of distance from the plants of from 10" to 42". A DC current operates the electric circuit ion generating means, and means are further provided for introducing a trace amount of AC current to trigger a pulse in the selected frequency.

Also a method is embodied in the invention which involves application of electrical ions to the microenvironment of a field of crops, the steps of method including transporting a transverse row of shielded wire brush-like ion emitters across row crops in a field, causing the ion emitters to emit electrical ions through said wire brush-like ion emitters into ambient environment and including at least a pair of selectable frequencies operable in a range of 90 HZ through 400 HZ, and preferably at 300 HZ, and manually controlling the discharge of the electrical ions through the shielded wire brush-like ion emitters upon placement of the shielded emitters in spaced overhead position relative to the crop plants.

BRIEF DESCRIPTION OF THE DRAWINGS

FIG. 1 is an enlarged perspective view of the apparatus of the present invention with the booms being extended and emitters being positioned on an underside thereof for emitting ions to the ambient plant microenvironment beneath the emitters.

FIG. 2 is an enlarged fragmentary close-up perspective view of a right hand boom of the apparatus shown in FIG. 1.

FIG. 3 is an enlarged fragmentary diagrammatic view illustrating a nylon rope or retention support cable and a collection of bell wires passing through a PVC support or tee as also shown in FIG. 1.

FIG. 4 is an enlarged fragmentary perspective view similar to FIG. 2 showing the right hand boom moved into a road traveling position and with bells thereof rotated 90° and pinned for transport.

FIG. 5 is an enlarged fragmentary perspective view of one ion emitter including a bell with the internal conductive "brush".

FIG. 6 is a top plan view illustrated in full and dotted lines of the apparatus illustrated in FIG. 1 with the dotted lines and the arrows illustrating how the plastic bells or emitters can be moved from an ion discharging position to a road travel position.

FIG. 7 is an enlarged fragmentary sectional view as viewed on the line 7—7 looking in the direction illustrated by the arrows in FIG. 6 showing transition of the metal frame of the prime mover to PVC tubing of the chassis of the apparatus.

FIG. 11 is a side elevation of the apparatus shown in FIG. 1 including the prime mover and with the bells operational and further showing a grounding disc on a weighted, pivotal frame.

FIG. 12 is a perspective view from an overhead vantage point illustrating the PVC tubular framework of the pivotal frame assembly and further illustrating the frame axle pivot and disclosing a weight block which forces the grounding disc into the soil.

FIG. 13 is an enlarged fragmentary vertical cross sectional view taken on the line 13—13 looking in the direction the PVC tubing in a formed metal "bearing".

DESCRIPTION OF THE PREFERRED EMBODIMENTS

Figure 8:
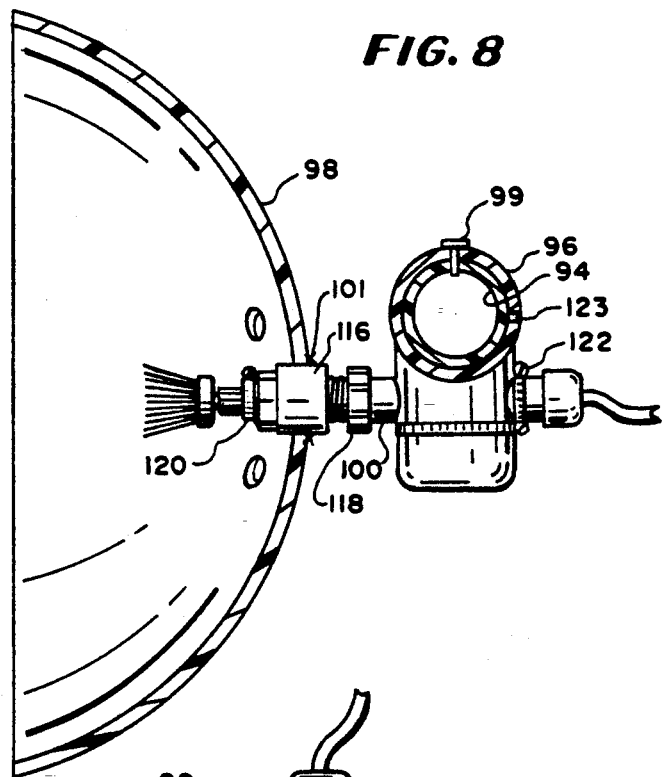
FIG. 8 is a fragmentary enlarged partially cross sectioned view of one of the bells in a transport position.

FIG. 1 shows an apparatus 10 used to generate ions into the ambient environment of crop plants in a cultivated field with the apparatus 10 being mounted on a prime mover or tractor-type vehicle 12. If desired, the apparatus 10 may be an independent unit, to be hitched to and towed by a tractor without departing from the invention.

The device has a chassis structure 14 which is made primarily of PVC tubing which isolates it from the steel chassis and other components of the prime mover or traction vehicle. The chassis structure 14 is comprised of straight tubes as at 16, 18, 20, and 22 which are telescoped into and secured to PVC tees 24 or ells 26.

An acrylic mounting assembly 28 consists of a deck sheet 30 secured to the chassis 14. Upon this deck sheet 30 is mounted a second acrylic sheet 32 which carries the pulse-generating "black boxes" 34 and 36, each of which have ancillary electrical components 38 mounted on circuit carrying bases 40. Upright swivel assemblies 42 and 44 are also formed from PVC tubing and on these swivel assemblies are mounted the twin boom assemblies 46 and 48. The boom assemblies 46 and 48 are also of PVC tubing, each having an array 50, 52 of high density polyethylene bells 98 thereon which are slidably and rotatably mounted on PVC tees.

The prime mover 12 consists of a steel chassis structure 13 with struts 54 and 56 carrying hydraulic motors 58 that provide propulsion to the wheels 60. An engine 62 provides power to operate the hydraulic systems which also include a separate hydraulic motor 64 that drives an alternator 66 to provide an electrical charging capability for a battery 68. The battery 68 supplies the primary electrical power to the pulse-generating boxes 34 and 36.

Just behind a driver's seat 70 is a hydraulic lift assembly 72 with a ram cylinder 74 containing a typical piston connected to operating ram shaft 76 to raise or lower the chassis 14 of the apparatus 10.

The right-hand boom assembly 46 and the basic chassis structure, with the apparatus in its working position relative to the prime mover 12, is illustrated in FIG. 2. Again, the chassis is comprised of PVC tubing as at 16, 18, 20 and 22 with connections via tees 24 and ells 26. The electrical pulse generators 34 and 36 mounted on acrylic decks 30 and 32 are overlaid with a transparent rain or heat cover shield 33.

The upright swivel assembly 42 consists of base tee 78 telescoping upwardly into tee 80 which is stabilized by tee 82 secured to PVC tube 16. The tee 80 is secured to a companion tee 84 which contains an upstanding PVC tube 86 inserted into another tee 88. Inserted into the bottom branch of tee 84 is still another tee 90 that carries boom members 92 and 94 which comprise the basic boom assembly 46.

Upon the boom members are slidable and rotatable tees 96 which in turn mount the bells 98 connected to recapped tubular sleeves 100. Conductors 102 are connected to the bells by appropriate fixtures within sleeves 100 and the boom extension is supported by cable 104 which is mounted transversely from the end of boom assembly 46 to the end of boom assembly 48 (FIG. 1). The PVC tubes 18 terminate by connection to the vehicle chassis at 106. A support cable 104 is passed through tee 88 with the conductors 102 attached by appropriate banding 103 to non-conductive cable (rope) 104 (FIG. 3).

The boom assembly 46 is rotatable 90° toward the chassis frame 13 of prime mover 12, for transport (FIG. 4). In this non-working position, the boom member 94 has been swung into a parallel relationship with frame 13 and is "snapped" into a stabilizing chock 108 mounted appropriately on the prime mover chassis 13.

The bells 98 can be rotated to a position 90° from their working position so that they assume a protective configuration, facing inwardly toward the chassis of both the apparatus 10 and prime mover 12. They can also be moved slidably along the boom extension to assume positions not in conflict with other parts of the unit.

The rotating action for the boom assembly is provided when tee 80 is turned upon its fixed axis that is comprised of telescoped branches of tees 78 and 82.

In FIG. 5 a high density polyethylene bell 98 is shown in perspective as viewed from below. The pinned tee 96 can be rotated or moved slidably by removing pin 99 and reinserting it in a drilled hole at another position along the boom extensions 92 and 94. The bell 98 is mounted on the polyvinyl chloride (PVC) sleeve 100 which passes through the boom. A fan-shaped wire brush-like cone or emitter 110 emits ions to the ambient environment over which the bell is passed. The emitters 110 operate in a 30 to 50 KV range, and preferably at 40 KV.

The boom assemblies 46 and 48 on the apparatus 10 and the prime mover 12 are shown in solid lines (FIG. 6) in their working position with bell arrays 50 and 52, respectively, facing down toward the earth.

In phantom lines, the boom assemblies are shown to have been rotated inwardly, as previously described, in a parallel relationship with the vehicle chassis 13 and the bells 98 have been rotated to face the apparatus. This latter configuration is for transport or storage only.

FIG. 7 (section 7—7 of FIG. 6) illustrates the means of isolating the apparatus chassis 14 from the vehicle chassis 13. The PVC tubing 16 is pressed into a tight relationship with a vehicle chassis protrusion 112, to which it can be physically secured by adhesion and pinning at its juncture 114.

Figure 9:
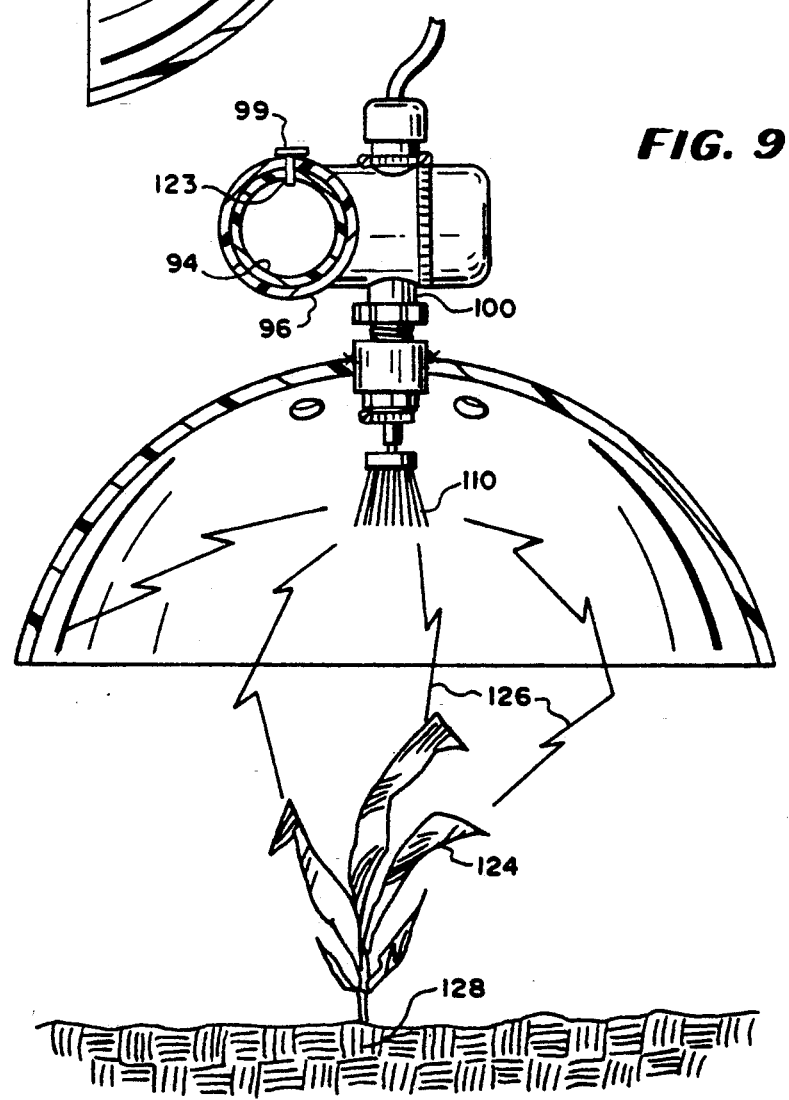
FIG. 9 is a view similar to FIG. 8 only showing the bell having been rotated into working relationship relative to the crop plant life indicating electrical discharge from the "brush" to the ambient plant microenvironment therebeneath.

A bell 98 is illustrated in section in FIG. 8 in the transport position with pin 99 retaining tee 96 on boom extension 94. The bell 98 is secured by a PVC weld 101 (FIG. 8) to collar 116 which is threadedly fastened to sleeve 100 and held by a locking ring 118. The relative position of the sleeve and tee is retained by ring clamps 120 and 122. The tee 96 is rotatable to place the bell 98 into a working relationship relative to the ambient microenvironment of the crop plant life 124 as depicted in FIG. 9.

The pin 99 is removed from its position in FIG. 8 so that it can be reinserted as shown in drilled hole 123 for proper alignment with boom extension 94. In this position, electrical pulses are presented to the bell via the wire cone 110. These pulses are emitted as somewhat "wild" electrical ionic discharges 126 which are restrained within the bell and refocused to seek earth 128.

Figure 10:
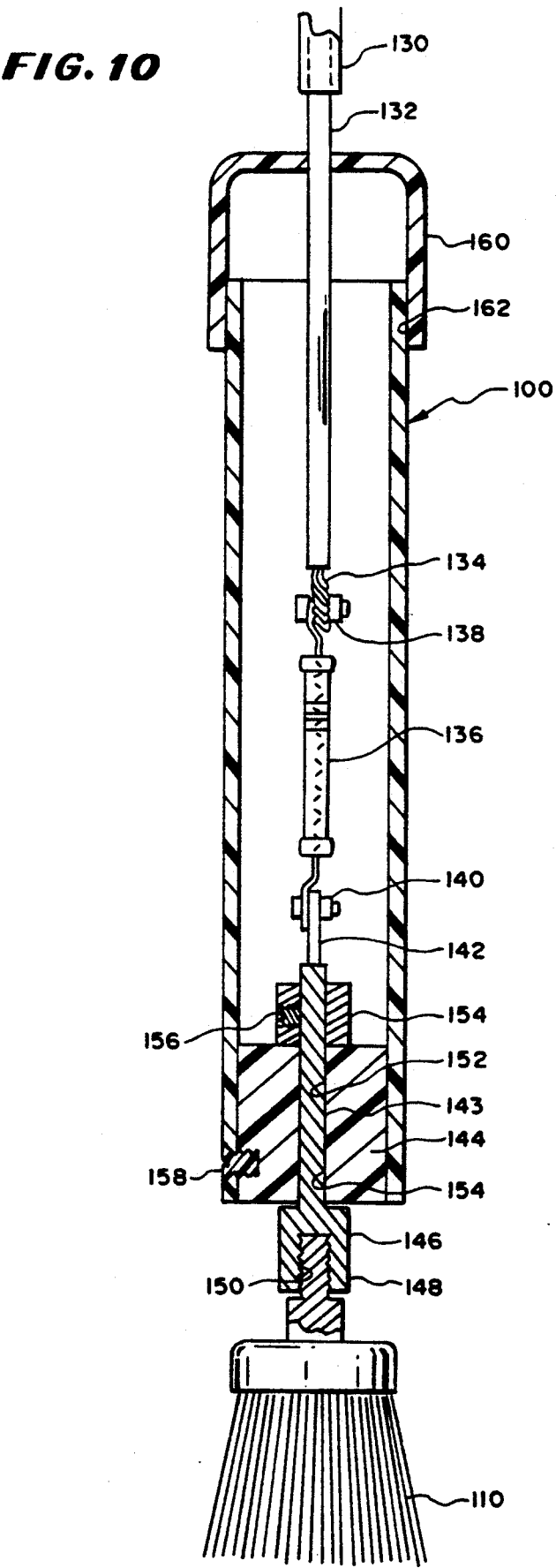
FIG. 10 is a sectional view of a plastic sleeve through which isolated electrical impulses are discharged via an indirect conduction resistor to reach a discharge emitting wire cone or brush.

The PVC sleeve 100 is shown in section in FIG. 10 and the electrical pulses are passed through the sleeve 100 to reach the discharge emitting wire cone 110 or brush which may have a diameter of 11" across the face of the wire bush or cone. The many steel wires in this cone each must be 0.010" in diameter. An external protective insulating covering 130 protects the internal conductive insulation 132 for the four-wire conductor 134. A resistor 136 is clamped to the stranded conductor 134 by clamp 138 and another clamping means 140 secures the resistor to the output conductor 142.

A metal shaft 143 is milled to pass snugly through PVC ring-block 144 with its larger end 146 formed as a square 148 to permit holding with a wrench while tightening wire cone 110 into a threaded hole 150. The milled diameter 152 of the metal shaft 143 is retained in the bore 154 of PVC ring-block 144 by a metal collar 154 anchored by a set-screw 156. The ring-block 144 is secured in the PVC sleeve 100 by a nylon set-screw 158. A cap 160 completes the enclosure by its seal at 162.

The prime mover 12 mounts a lifting assembly 72 on the apparatus (see side elevation in FIG. 11) which provides a hydraulic vertical movement to the chassis 14 so that the bells can be placed in a range B from 10" to 42" from the crop plant life 124. The frame 73 is moved vertically by ram 76 operating within cylinder 74 to accomplish this movement. A transverse frame member 164, attached to vehicle frame 13, is so arranged as to support a pivotally moveable PVC framework 166 having a steel or Coulter wheel grounding disc 168 mounted thereon. Grounding disc 168 completes the electrical circuit, drawing the ions generated through the air, and the soil, thereto.

A critical distance A of 4 to 7 feet must be maintained between the disc 168 and the nearest wire-cone discharge element 110 in order to insure the proper flow of ions from the emitters through the ambient microenvironment to the disc 168 within the ground to complete the electrical circuit.

In this respect, it is believed that an electrical bias is established between the soil (by the presence of disc 168) and the emitters and that ions or charged nitrogen compounds resulting from the fixation process are believed to follow a path between the emitters and the soil through air alone, or through air and possibly to exposed plant surfaces, in a non-destructive manner, and into the soil toward the grounding plate 168.

Thus, the field, the ambient microenvironment of the crop plants, is treated and plants growing within the field may be inherently treated in that they might offer a path of reduced resistance along the energy gradient or bias established and inherently benefit from the higher concentrations of available nitrogen afforded by the apparatus 10.

The pivotal frame 166 which supports the disc is manually raised by a cable 170 which runs to a winch 172 near the driver's seat. In the operating position, the grounding disc is forced into the earth by a weight 174 bolted to frame 166. FIG. 12 is a perspective view from above showing the PVC tubular framework of the pivotal frame assembly 166 and the manner in which the tube rotates in vehicle chassis frame component 164. PVC tubing 176 electrically isolates the pivotal frame from the vehicle chassis component 164 by virtue of its insertion between retaining plate 178 and a pin 180 (FIG. 13 taken on 13—13 of FIG. 12). A series of PVC tees 182 are secured to the PVC axle 176 and from each are extended PVC tubings 184 in parallel relationship. These terminate at the lower end in tees 186 and ells 188. The two innermost tubes have U-bolts 189 placed upon them to hold a mounting plate 190 to which angle braces 192 are welded. An axle bolt 194 then holds the grounding disc 168 in a vertical plane. The weight 174 is bolted to a transverse plate 196 so that the two members straddle and tighten against the PVC tubing.

Figure 14:
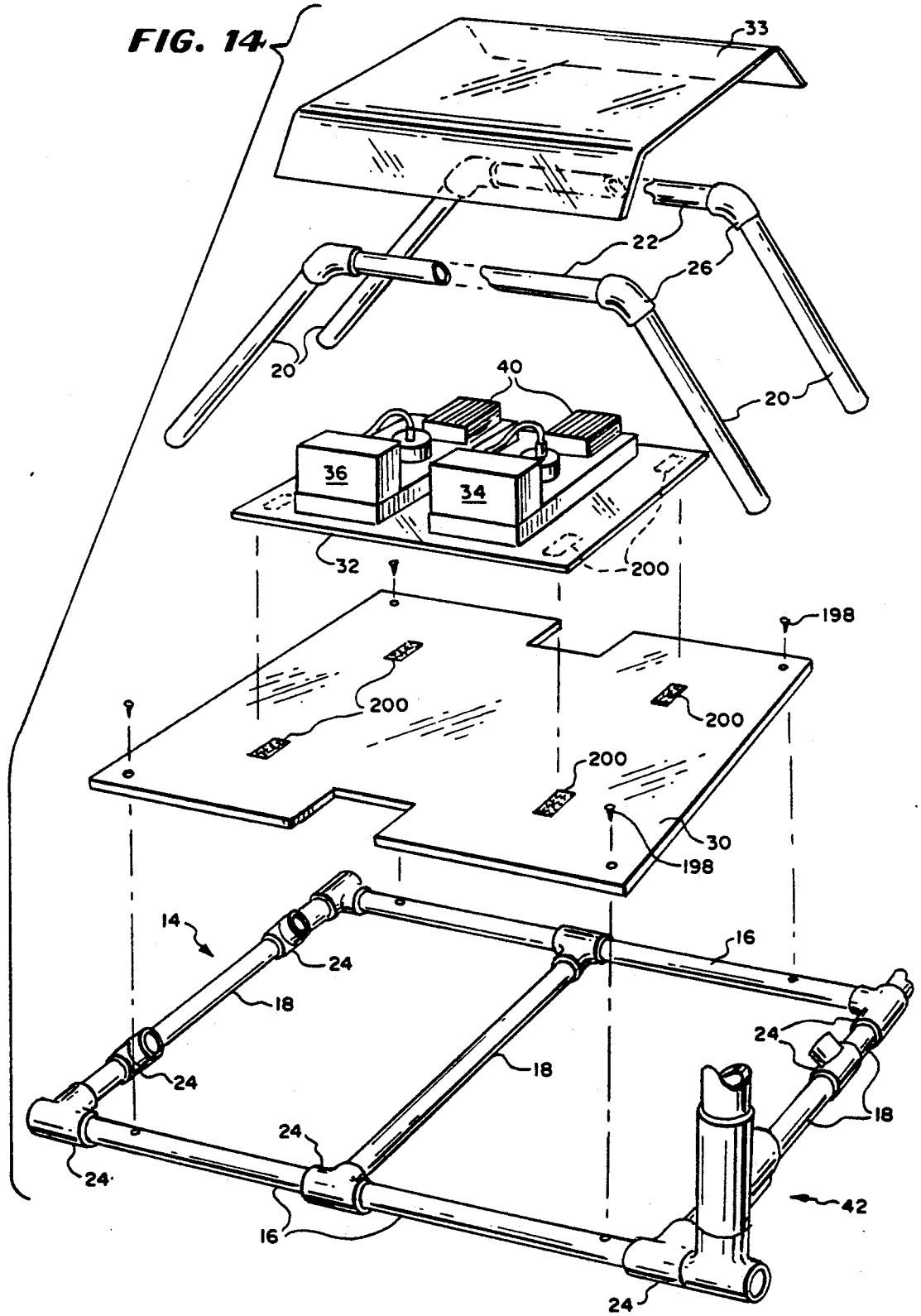
FIG. 14 is an exploded view illustrating the essential elements of the chassis and the mounting means for electrical pulse generating equipment.

The critical elements of the chassis are shown in exploded perspective in FIG. 14 in addition to the mounting means for the electrical pulse generating equipment. The chassis components comprising PVC tubings 16 through 22, PVC tees 24, and PVC ells 26, are represented in a fully assembled depiction. A portion of the swivel assembly 42 is shown only for orientation. A deck 30 is mounted to the chassis 14 by fasteners 198. "Velcro" patches 200 are adhesively secured to this deck at four points to align with matching "Velcro" pieces attached to the underside of upper deck 32. In this manner, the deck, which actually mounts the electrical circuit bases 40, can be quickly attached to or removed from the apparatus. The circuit bases have fixedly attached electrical pulse generators 34 and 36 in addition to companion electrical components 38. PVC tubes 20 form struts that form a raised frame upon which is mounted the lucite cover 33.

Figure 15:
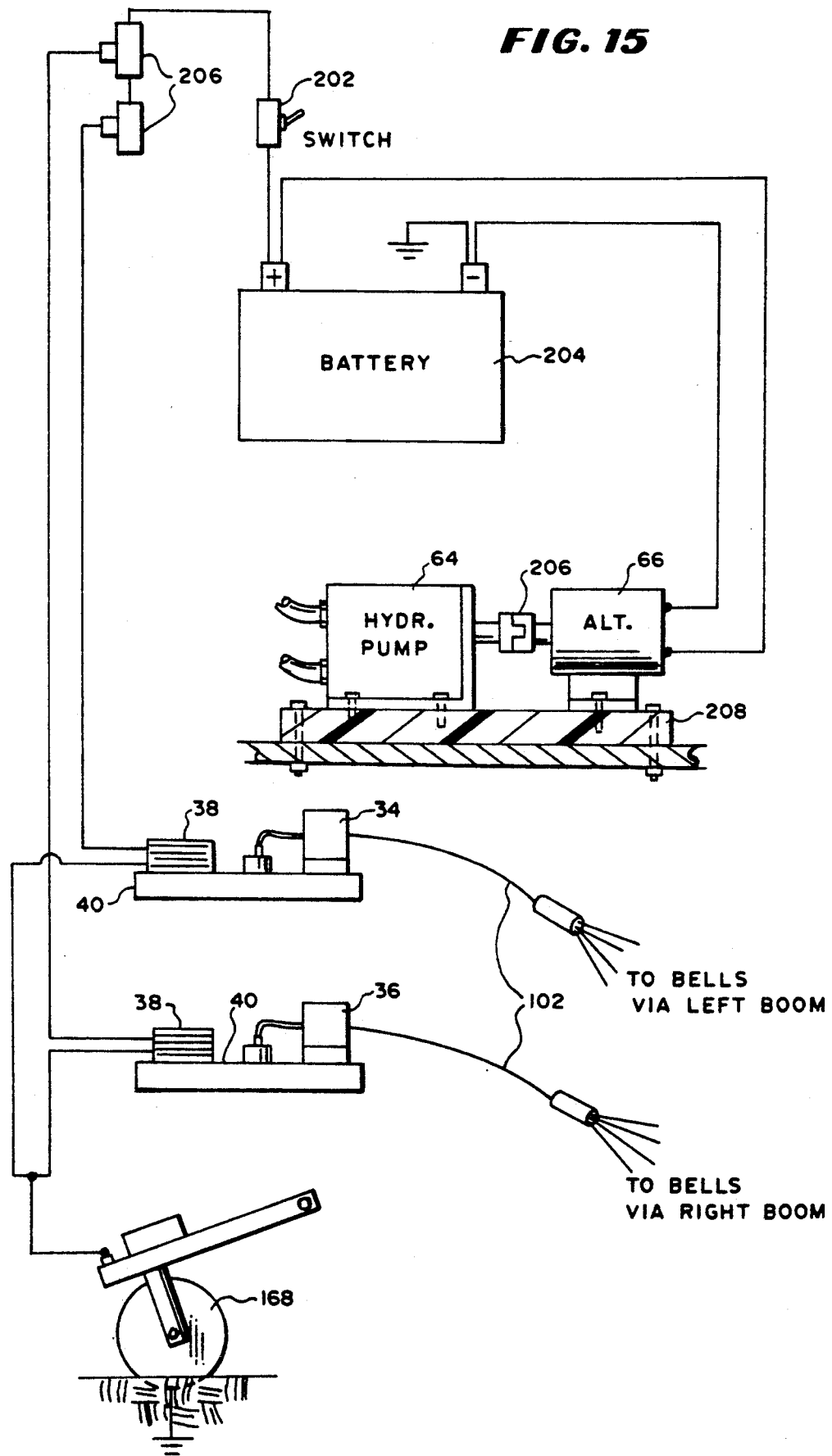
FIG. 15 is a simplified circuit diagram of selected electrical and hydraulic components and showing pump/alternator isolation from the prime mover frame.

FIG. 15 is a simple circuit diagram which graphically connects the basic components of the device. A switch 202 enables the circuit to function and a primary lead from the battery 204 to receptacles 206 carries current to the electrical circuits at 40. Each electrical box contains a pulse generator as indicated at 34 and 36, with ancillary electrical components at 38. Output conductors 102 are connected to the individual bells on each boom. The electrical path is completed via the ambient environment of the crop plants, earth, and grounding disc 168. Charging voltage to the battery is supplied from the alternator 66 which is driven through an insulating coupling 206 by hydraulic motor 64. Both the motor and alternator are electrically insulated from the vehicle chassis by nylon block 208.

ELECTRONIC CIRCUIT DESCRIPTION

Figure 16:
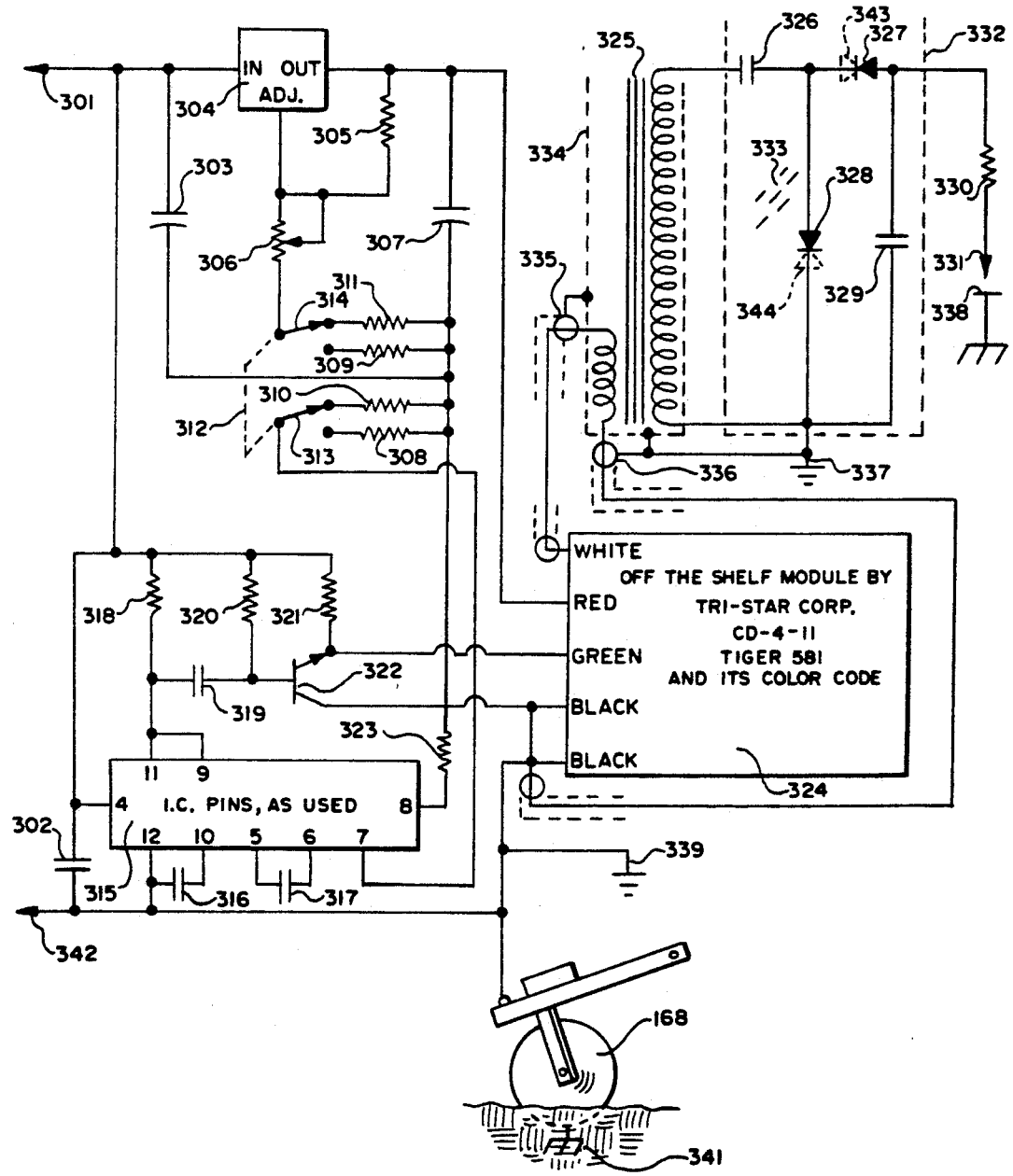
FIG. 16 is an electrical circuit diagram of the electrical apparatus for generating ions to be discharged from the apparatus with a diode of the circuit being illustrated in full and dotted lines for depicting a reversal of current flow in the circuit.

An electronic circuit 300 for the apparatus is illustrated in FIG. 16. The circuit includes a pulsed high output ion generator with two selectable frequencies in the range of 90 HZ through 400 HZ. The pulses have a high acceleration potential and due to light filtering, show an exponential decay between pulses. This action induces fixation of nitrogen in the ambient microenvironment of the field. The circuit operates as follows:

With connector 301 connected to the positive terminal of a 12 volt automotive battery through the switch (FIG. 15) and a connector 342 connected to the negative side of the same battery, plus voltage is fed to the input filter capacitor 303 of the adjustable voltage regulator 304. Its circuitry includes feedback resistor 305, voltage adjustment rheostat 306, voltage tweaking resistors 309 and 311, and output filter capacitor 307.

This regulator provides a highly stable voltage to the red lead of 304 and is required because of high system gain, to insure a highly stable output voltage. Tweaking resistors 309 and 311 will be explained later.

Continuing, capacitor 302 provides filtering for the positive supply terminal pin 41 of the circuit 315, a monolithic function generator. This generator is set up as a pulse generator with pin 121 being the negative supply pin, and connected to the negative battery terminal through connector 342 from pin 101. Capacitor 316 also connected to 342 and acts as the reference voltage bypass capacitor for circuit 315. Capacitor 317 is the timing capacitor connected to pin 51 and pin 61 of 315. Resistor 323 is one of the timing resistors for the circuit 315 and is connected between pin 81 of 315 and the negative supply. Pin 71 of 315 is connected to the wiper of a double pole double throw, make before break, switch 313 and selects the other timing resistor for circuit resistor 308 which controls the high frequency, and the resistor 310 which is the low frequency control. These resistors are connected then to the negative supply, in conjunction with resistors 308 and 310. Resistors 309 and 311, are the tweaking resistors connected to the negative supply and selected by wiper 314 and are ganged to wiper 313 as indicated by 312, due to duty cycle effects as frequencies are changed to the red input terminal of the module 324, so that the high voltage output of the transformers 325 remains constant as frequencies are changed. Resistors 309 and 311 are hand selected as are the frequency control resistors 308 and 310.

Getting back to the circuit 315, resistor 318 supplies positive voltage thru pin 111 to the square wave output of the circuit 315. This square wave output is also connected to pin 91 of the circuit 315, the frequency shift keying input, so as to shift between two frequencies for the positive and negative of the square wave so as to affect duty cycle and frequency.

Capacitor 319 from pins 111-91 of the circuit 315 and resistor 320 turn the square wave output of 335 into a narrow pulse which drives the base of transistor 322. Resistor 321 is the emitter resistor for transistor 322, the output of transistor 322 provides trigger pulses to the green terminal of the capacitive discharge ignition module 324 causing it to output the driving voltage from the white terminal through the shielded cable 335 to the primary of transformer 325, the return path being through shielded cable 336 to both black terminals of 324 and the negative supply. The shielded cables 335 and 336 have their outer shield grounded to transformer 325, outer metal shell 334, the bottom of the secondary winding of transformer 325, and chassis ground 337. The purpose of cables 335 and 336 being shielded is to prevent false triggering in 315 and 322.

A high voltage half-wave doubler 332, encased in a plastic container, consists of capacitor 326, diode 327, diode 328 and capacitor 329. These units are surrounded by a silicon rubber filling material 333 to prevent component failure from high voltage arc-over.

In operation, assume the primary of the high voltage transformer 325 has been pulsed by the module 324 through the cable 335, the secondary of the transformer 325 and its stray capacity form a tuned circuit, resonant at some frequency. This decaying A.C. voltage is fed to capacitor 326, and assuming the voltage to 326 at this point is positive, the diode 327 blacks this voltage but the diode 328 conducts to ground 337. This allows the capacitor 326 to charge to about 1.4 times the R.M.S. voltage of the transformer 325. As the polarity of the transformer 325 becomes negative, the diode 328 blocks and the diode 327 conducts, and as the lower end of the capacitor 329 is grounded at the chassis ground 337, the 1.4 times R.M.S. charge stored in the capacitor 326 is added to the 1.4 times R.M.S. voltage from the transformer 325, and is stored as a 2.8 times R.M.S. voltage in the capacitor 329 and sent on to resistor 330, and a multi-point emitting electrode 331. At this electrode 331, due to the voltage being so high, high velocity negative ions are generated and focused earthward, earth ground being illustrated at 338. In FIG. 16 the circuit is nearly identical to that of FIG. 15 except that diode 327 is reversed, represented by 343, and diode 328 is reversed represented by arrow 344, and positive ions are produced. The remainder of the circuitry consists of chassis ground 339, the Coulter wheel or disc assembly 168, which cuts into the earth to insure that negative supply 342 chassis grounds 337 and 339 have a good earth ground, represented by 341. The module 324 comprises a shelf module manufactured by FRI-STAR CORP. CD-4-11, Tiger 581 and its color code.

The invention has been described in its preferred embodiment. However, it may be understood that modifications may be made therein without departing from the spirit of the invention. It is therefore desired that the invention be limited only by the scope of the appended claims.

I claim:

1. A method of applying electrical ions by means to be moved over a field of crop for above ground atmospheric treatment of growing plants, comprising the steps of transporting a transverse row of shielded wire brush-like electron emitters across row crops in a field, causing the electron emitters to emit electrons through said wire brush-like emitters into the above ground atmosphere along an electrical bias caused by means including a grounded wheel dragged in the ground ahead of the emitters, the emitters including at least a pair of selectable frequencies operable in a range of 90 HZ through 400 HZ, and controlling the discharge of the electrons through the shielded wire brush-like electron emitters upon placement of the shielded emitters in spaced overhead position to the plants being treated.

2. The method of claim 1 wherein the electron emitters are positioned in an ideal range of distance from the plants of from 10" to 42".

3. The method of claim 1 where the grounding wheel is positioned 4' to 7' ahead of the emitters to establish the electrical bias.

4. The method of claim 1 where the electrons are pulsed at a rate of 90 HZ to 400 HZ.

5. The method of claim 1 where the electrons are pulsed at a rate of 300 HZ.

6. A method of applying electrical ions by means to be moved over a field of crop for above ground atmospheric treatment of growing plants, comprising the steps of transporting a transverse row of shielded wire brush-like electron emitters across row crops in a field, causing the electron emitters to emit electrons through said wire brush-like emitters into the above ground atmosphere to follow an electrical bias to the ground established by a grounded wheel dragged in the ground ahead of the emitters, the emitters including at least a pair of selectable frequencies operable in a range of 90 HZ to 400 HZ, and controlling the discharge of the electrons through the shielded wire brush-like electron emitters upon placement of the shielded electron emitters in spaced overhead position to the plants being treated, positioning the electron emitters in an ideal range of distance from the plants of from 10" to 42", the electron emitters operating at a rate of 30 to 50 KV.

7. An electrical ion emitting farming apparatus to be towed across a field of crop plants planted in earth for fixation of nitrogen in the ambient environment of the cultivated plants comprising a frame, means for connecting the frame to a vehicle, a boom means mounting the boom on the frame so as to extend transversely of the frame and transversely of a towed path of travel of the frame through a field of crops, a series of bell-shaped members mounted at spaced intervals on the boom across its transversely extended length and with the bell-shaped members opening in a downward direction toward the plants, a wire brush-like electron emitter centrally mounted in each of said bell-shaped members, electrical circuit electron generating means for emitting electrons through said wire brush-like electron emitter, power means for energizing said electrical circuit means, and control means for activating said electrical circuit means for causing electron emission through said wire brush-like electron emitter upon placement of said bell-shaped members in spaced overhead position relative to the plants and electrical ground means to be dragged in the earth, for ultimately attracting ions formed by the electron emission to the earth.

8. The implement of claim 7 wherein said electrical circuit electron generating means include a pulsed high output electron generator.

9. The implement of claim 7 wherein said electrical circuit electron generating means include a pulsed high output electron generator, said generator having at least a pair of selectable frequencies operable in a range of 90 HZ to 400HZ.

10. The implement of claim 7 wherein said electrical circuit electron generating means includes a pulsed high output electron generator, the generator having a capacity to create pulses having a high accelerating potential, and due to light filtering, show an exponential decay between pulses, which causes chemical reactions to change free atmospheric nitrogen to a form which is available to plants.

11. The implement of claim 10 wherein said generator has at least a pair of selectable frequencies operable in a range of 90 HZ through 400 HZ.

12. The implement of claim 7 further characterized by said boom being comprised of two sections, means mounted on said frame enabling said boom sections to be folded forwardly to extend along side said frame rather than transversely of said frame when the implement is to be placed in a road travel condition, the boom sections being pivotal in an opposite direction so as to extend transversely of said frame, means for locking said boom sections in either a transverse position in readiness for electron emission or in a collapsed road travel position as required.

13. The electrical ion emitting farming implement of claim 7 wherein the electron emitter operates in the 30 to 50 KV range.

14. The electrical ion emitting farming implement of claim 7 wherein a DC current is used in operating said electric circuit electron generating means.

15. The electrical ion emitting farming implement of claim 7 wherein a DC current is used in operating said electric circuit electron generating means, and including means for introducing a trace amount of AC current to trigger a pulse in the selected frequency.

16. An electrical ion emitting farming apparatus to be moved over a field of crops planted in earth for fixation of nitrogen in the ambient microenvironment of the crop plants comprising a frame, means for connecting the frame to a vehicle, a boom means mounting the boom on the frame so as to extend transversely of the frame and transversely of a towed path of travel of the frame through a field of crops, a series of bell-shaped members mounted at spaced intervals on the boom across its transversely extended length and with the bell-shaped members opening in a downward direction toward the plants, a wire brush-like electron emitter centrally mounted in each of the said bell-shaped members, electrical circuit electron generating means operatively connected to said wire brush-like electron emitters for emitting electrons in the 30 to 50 KV range through said wire brush-like emitter into the ambient environment including at least a pair of selectable frequencies operable in a range of 90 HZ through 400 HZ, power means for energizing said electrical circuit means, control means for activating said electrical circuit means for causing electron emission through said wire brush-like emitters upon placement of said bell-shaped members in spaced overhead position to the crop plants, in a cultivated field, and electrical ground means to be dragged in the earth positioned in operative relation to said wire brush-like emitters to create an electrical bias between said wire brush-like emitters and the earth.

17. The apparatus of claim 16 wherein said electrical circuit electron generating means include a pulsed high output electron generator, the electrical ground means comprising a metallic coulter wheel grounding disc positioned 4' to 7' ahead of said emitters.

18. The apparatus of claim 16 wherein said electrical circuit electron generating means include a pulsed high output generator, said emitter being positioned in an ideal range of distance form the plants of from 10" to 42".

19. The apparatus of claim 16 wherein said electrical circuit electron generating means include a pulsed high output electron generator, the generator having a capacity to create pulses having a high acceleration potential.

20. The apparatus of claim 19 wherein said electron emitters are positioned in an ideal range of distance from the plants of 10" to 42".

21. The apparatus of claim 16 further characterized by said boom being comprised of two sections, means mounted on said frame enabling said boom sections to be folded forwardly to extend alongside said frame rather than transversely of said frame when the apparatus is to be placed in a road travel condition, the boom sections being pivotal in an opposite direction so as to extend transversely of said frame, means for locking said boom sections in either a transverse position in readiness for electron emission or in a collapsed road travel position, as required.

22. The electrical ion emitting farming apparatus of claim 16 wherein the electron emitter operates at a preferred rate of 40 KV.

23. The electrical ion emitting farming apparatus of claim 16 wherein a DC current is used in operating said electrical circuit electron generating means.

24. The electrical ion emitting farming implement of claim 16 wherein means providing a DC current is used in operating said electrical circuit electron generating means, and included are means for introducing a trace amount of AC current to trigger a pulse on a frequency.

25. An electrical ion emitting farming implement to be towed in a field of crop planted in the earth for above ground atmospheric treatment of growing plants comprising a frame, means for connecting the frame to a vehicle, a boom means mounting the boom on the frame so as to extend transversely of the frame and transversely of a towed path of travel of the frame through a field of crops, a series of bell-shaped members mounted at spaced intervals on the boom across its transversely extended length and with the bell-shaped members opening in a downward direction toward the plants, means positioning the boom on the frame so that said bell-shaped members can be maintained a distance of 10" to 42" from the plants, a wire brush-like electron emitter centrally mounted in each of said bell-shaped members, electrical circuit electron generating means for emitting electrons through said wire brush-like electron emitter, power means for energizing said electrical circuit means, control means for activating said electrical circuit means for causing electron emission through said wire brush-like electron emitter upon placement of said bell-shaped members in spaced overhead position to the plants being treated and electrical ground means to be dragged in the earth including a grounding wheel suspended from beneath the frame forwardly of the emitters operable to establish an electrical bias between the emitters and the earth.

26. The implement of claim 25 wherein said electrical circuit electron generating means includes a pulsed high output electron generator.

27. The implement of claim 25 wherein said electrical circuit electron generating means includes a pulsed high output electron generator, said generator having at least a pair of selectable frequencies operable in a range of 90 HZ to 400 HZ.

28. The implement of claim 25 wherein said electrical circuit electron generating means includes a pulsed high output electron generator, the generator having a capacity to create pulses having a high acceleration potential.

29. The implement of claim 25 where the electrons are pulsed at a rate of 300 HZ.

30. The implement of claim 25 wherein the electron emitters are positioned in an ideal range of distance from the plants of from 10" to 42".

31. The electrical ion emitting farming implement of claim 25 wherein the electron emitter operates in the 30 to 50 KV range.

32. The electrical ion emitting farming implement of claim 25 wherein a DC current is used in operating said electric circuit electron generating means.

33. The electrical ion emitting farming implement of claim 25 wherein a DC current is used in operating said electric circuit electron generating means, and means are included for introducing a trace amount of AC current to rigger a pulse in the selected frequency.

34. The implement of claim 25 wherein the electron emitter operates at 40 KV.

* * * * *